United States Patent [19]

Boutni

[11] Patent Number: 4,767,818

[45] Date of Patent: Aug. 30, 1988

[54] LOW GLOSS, FLAME RETARDANT POLYCARBONATE COMPOSITIONS

[75] Inventor: Omar M. Boutni, Mt. Vernon, Ind.

[73] Assignee: General Electric Company, Mt. Vernon, Ind.

[21] Appl. No.: 29,129

[22] Filed: Mar. 23, 1987

[51] Int. Cl.$^4$ .................. C08K 5/42; C08L 53/02
[52] U.S. Cl. .................. 524/505; 524/164; 524/537
[58] Field of Search ............ 524/505, 537, 164

[56] References Cited

U.S. PATENT DOCUMENTS

| | | |
|---|---|---|
| 3,640,943 | 2/1972 | Bostick et al. |
| 3,686,355 | 8/1972 | Gaines et al. |
| 3,961,122 | 6/1976 | Gaines et al. |
| 3,971,756 | 7/1976 | Bialous et al. ............ 524/164 |
| 4,224,215 | 9/1980 | Macke. |
| 4,263,201 | 4/1981 | Mark et al. ............ 524/164 |
| 4,391,935 | 7/1983 | Bialous et al. ............ 524/164 |
| 4,477,637 | 10/1984 | Krishnan ............ 524/164 |
| 4,532,283 | 7/1985 | Liu ............ 524/505 |
| 4,537,930 | 8/1985 | Bussink et al. ............ 524/505 |
| 4,584,338 | 4/1986 | Liu ............ 524/505 |

*Primary Examiner*—Lewis T. Jacobs
*Attorney, Agent, or Firm*—Martin B. Barancik

[57] ABSTRACT

A composition comprising an aromatic polycarbonate having a number average molecular weight of from about 6,000 to about 12,000 in admixture with (a) at least 3 weight percent of a polymer selected from the group consisting of a random block copolymer having polycarbonate block(s) and diorganosiloxane block(s); and a block copolymer of a vinylaromatic and an alkadiene;

(b) a flame retardant package comprising a flame retardant salt, said package in quantities sufficient to achieve $V_0$ or $V_1$ in a part 93 mils thick; and (c) said composition having an exterior gloss of less than about 80 as measured by a Gardner Glossmeter at 60° gloss.

20 Claims, No Drawings

LOW GLOSS, FLAME RETARDANT POLYCARBONATE COMPOSITIONS

BACKGROUND OF THE INVENTION

Aromatic carbonate resins such as polycarbonate resins are thermoplastic resinous materials possessing many excellent physical and chemical properties which render them useful in a wide range of applications. They exhibit, for example, excellent properties of toughness, impact resistance, heat resistance and dimensional stability, optical clarity or non-opaqueness, and physiological inertness. Because of their excellent property spectrum, polycarbonate resins are used in various utilities including molded and extruded articles. A particular application wherein thermoplastics have found significant use is in housings for business equipment. Such housings should generally be thin, lightweight, impact resistant, heat resistant, flame resistant and preferably have a low gloss so as to be pleasing to the eye over long periods of time. Polycarbonates have been used in numerous business equipment applications wherein relatively thick housings can be employed. However, wherein thinner housings must be employed, polycarbonates have not faired as successfully. The melt viscosities of polycarbonates are generally high, therefore making it more difficult to mold thin parts. When low viscosity, low molecular weight polycarbonates are employed, the article tends to be brittle as shown by ⅛ inch Notched Izod impact testing. Accompanying this brittleness is the difficulty in flame retarding a low viscosity polycarbonate, particularly in thin section. Such polycarbonates have a tendency to be highly fluid, particularly at the temperatures of flame, thereby making it difficult to pass the Underwriter Laboratory flaming drip criteria to qualify as $V_1$ or $V_0$. Additionally, the polycarbonate generally has a glossy exterior upon molding.

A new composition of matter has been discovered which is useful for thin housings of business equipment. It is a high flow polycarbonate composition which remains highly impact resistant as well as flame retardant in thin section while still maintaining a relatively low gloss exterior when molded.

SUMMARY OF THE INVENTION

In accordance with the invention there is a composition comprising an aromatic polycarbonate having a number average molecular weight of from about 6,000 to about 12,000 in admixture with (a) at least 3 weight percent of a polymer selected from a random block copolymer having polycarbonate block(s) and diorganosiloxane block(s) and a block copolymer of a vinyl aromatic and an alkadiene, the weight percent based upon the quantity of polycarbonate;

(b) a flame retardant package comprising a flame retardant salt, said package in quantities sufficient to achieve a $V_0$ or $V_1$ in a part 93 mils thick; and (c) said composition having an exterior gloss of less than about 80 as measured by a Gardner glossmeter at 60° gloss.

DETAILED DESCRIPTION OF THE INVENTION

The aromatic polycarbonate useful herein can generally be prepared by the reaction of at least one dihydric phenol and a carbonate precursor such as phosgene, a haloformate, or a carbonate ester. Generally speaking, such polycarbonate resins may be typified as being comprised of at least one recurring structural unit represented by the formula

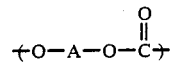

I.

wherein A is a divalent aromatic residue of the dihydric phenol employed in the polymer forming reaction. The dihydric phenols which may be employed to provide such aromatic carbonate polymers may be represented by the general formula

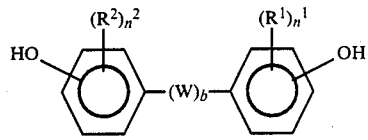

II.

wherein:
$R^2$ is independently selected from halogen, monovalent hydrocarbon, and monovalent hydrocarbonoxy radicals;
$R^1$ is independently selected from halogen, monovalent hydrocarbon, and monovalent hydrocarbonoxy radicals;
W is selected from divalent hydrocarbon radicals, —S—, —S—S—, —O—,

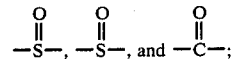

$n^2$ and $n^1$ are independently selected from integers having a value from 0 to 4 inclusive; and
b is either zero or one.

The monovalent hydrocarbon radicals represented by $R^2$ and $R^1$ include the alkyl, cycloalkyl, aryl, aralkyl and alkaryl radicals. The preferred alkyl radicals are those containing from 1 to about 12 carbon atoms. The preferred cycloalklyl radicals are those containing from about 4 to about 8 ring carbon atoms. The preferred aryl radicals are those containing from 6 to 12 ring carbon atoms, i.e., phenyl, naphthyl, and biphenyl. The preferred alkaryl and radicals are those containing from 7 to about 14 carbon atoms.

The preferred halogen radicals represented by $R^2$ and $R^1$ are chlorine and bromine.

The divalent hydrocarbon radicals represented by W include the alkylene, alkylidene, cycloalkylene, and cycloalkylidene radicals. The preferred alkylene radicals are those which contain from 2 to about 30 carbon atoms. The preferred alkylidene radicals are those containing from 1 to about 30 carbon atoms. The preferred cycloalkylene and cycloalkylidene radicals are those containing from 6 to about 16 ring carbon atoms.

The monovalent hydrocarbonoxy radicals represented by $R^2$ and $R^1$ may be represented by the formula —$OR^3$ wherein $R^3$ is a monovalent hydrocarbon radical of the type described hereinafore for $R^2$ and $R^1$. Preferred monovalent hydrocarbonoxy radicals are the alkoxy and aryloxy radicals.

Some illustrative non-limiting examples of the dihydric phenols falling within the scope of Formula II include:

2,2-bis(4-hydroxyphenyl)propane (bisphenol-A);
2,2-bis(3,5-dibromo-4-hydroxyphenyl)propane;
2,2-bis(3,5-dimethyl-4-hydroxyphenyl)propane;
1,1-bis(4-hydroxyphenyl)cyclohexane;
1,1-bis(3,5-dimethyl-4-hydroxyphenyl)cyclohexane;
1,1-bis(4-hydroxyphenyl)decane;
1,4-bis(4-hydroxyphenyl)propane;
1,1-bis(hydroxyphenyl)cyclododecane;
1,1-bis(3,5-dimethyl-4-hydroxyphenyl)cyclododecane;
4,4'-dihydroxydiphenyl ether;
4,4'-thiodiphenol;
4,4'-dihydroxy-3,3'-dichlorodiphenyl ether; and
4,4'-dihydroxy-2,5-dihydroxydiphenyl ether.

Other useful dihydric phenols which are also suitable for use in the preparation of the above polycarbonates, are disclosed in U.S. Pat. Nos. 2,999,835; 3,028,365; 3,334,154; and 4,131,575, all of which are incorporated herein by reference.

These aromatic polycarbonates can be manufactured by known processes, such as, for example and as mentioned above, by reacting a dihydric phenol with a carbonate precursor, such as phosgene, in accordance with methods as set forth in the above-cited literature and U.S. Pat. Nos. 4,018,750 and 4,123,436, incorporated herein by reference, or by transesterification processes such as disclosed in U.S. Pat. No. 3,153,008, incorporated by reference, as well as other processes known to those skilled in the art.

It is possible to employ two or more different dihydric phenols or a copolymer of a dihydric phenol with glycol or with a hydroxy or acid terminated polyester or with a dibasic acid in the event a carbonate copolymer or interpolymer rather than a homopolymer is desired for use in the preparation of the polycarbonate mixture of the invention. Branched polycarbonates are also useful, such as those described in U.S. Pat. No. 4,001,184, incorporated herein by reference. Also there can be utilized blends of a linear polycarbonate and a branched polycarbonate. Moreover, blends of any of the above materials may be employed in the practice of this invention to provide the aromatic polycarbonate. In any event, the preferred aromatic carbonate polymer for use herein is a homopolymer derived from 2,2-bis(4-hydroxyphenyl)propane (bisphenol-A).

The polycarbonate is of very low molecular weight, generally from about 6,000 to about 12,000 number average molecular weight, preferably from about 8,000 to about 10,000. This lower molecular weight, high flow resin is achieved among several methods by using more chainstopper compound, thereby decreasing the average chain length of polycarbonate. Such chainstoppers include monophenolic compounds as phenol, p-tertiarybutyl phenol and the like as well as the larger molecules such as paracumyl phenol and Chroman-I. Although most of the typical values for properties of polycarbonate of high molecular weight, for example those polycarbonates in the range of from about 0.40 to about 0.60 intrinsic viscosity at 25° C. in methylene chloride are achieved, the high flow polycarbonate is somewhat brittle, as measured by ⅛ inch Notched Izod, ASTM 256. The ⅛ inch Notched Izod impact is reduced substantially to about 1-2 from about 15-16. The resin retains its lustrous look upon molding and is very difficult to flame retard because of its high flow character. However, it is this high flow which allows the resin to be extruded into thin walled, large parts which are used in various applications including business equipment housing. The difficulties in achieving the increased ductility, flame retardance and reduced gloss are overcome by the specific resins and additives employed in the inventive composition and are described below The resins which increase the impact resistance of the high flow polycarbonate and allow the achievement of the flame retardance coupled with low luster are selected from the group consisting of a random block copolymer of polycarbonate units and diorganosiloxane units as described in Howard A. Vaughn, Jr. U.S. Pat. No. 3,189,662 assigned to General Electric Company and incorporated by reference in this application and a block copolymer of a vinyl aromatic and an alkadiene as described in U.S. Pat. Nos. 4,481,331 and 4,537,930.

The polysiloxane polycarbonate block copolymers can be expressed by the average formula:

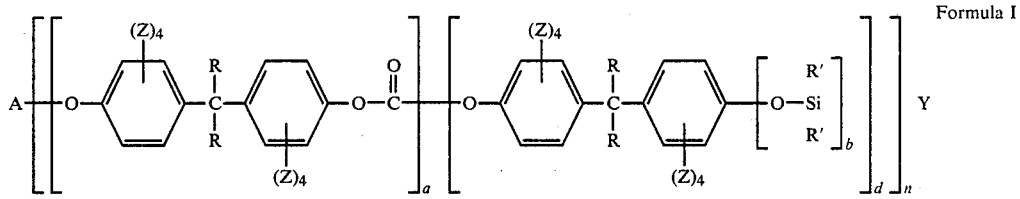

Formula I where n is at least 1, and preferably n is an integer equal to from 1 to about 1000, inclusive, a is equal to from 1 to about 200, inclusive, b is equal to from about 5 to about 200, inclusive, and preferably b has an average value from about 15 to about 90, inclusive, while the ratio of a to b can vary from about 0.05 to about 3, inclusive, and when b has an average value of from about 15 to about 90, inclusive, the ratio of a to b is preferably from about 0.067 to about 0.45, inclusive, and d is 1 or more, y is

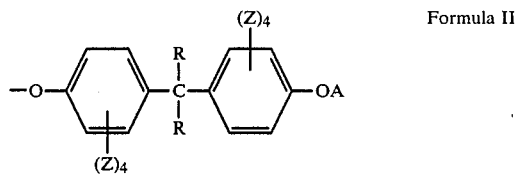

Formula II

A is a member selected from the class of hydrogen and

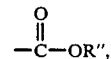

each R is independently a member selected from the class of hydrogen, monovalent hydrocarbon radicals and halogenated monovalent hydrocarbon radicals, each R' is independently a member selected from the class of monovalent hydrocarbon radicals, halogenated monovalent hydrocarbon radicals and cyanoalkyl radicals, R" is a member selected from the class consisting of monovalent hydrocarbon radicals and halogenated hydrocarbon radicals, and each Z is independently a member selected from the class of hydrogen, lower alkyl radicals and halogen radicals and mixtures thereof.

Included within the radicals represented by R of Formula 1 are aryl radicals and halogenated aryl radicals such as phenyl, chlorophenyl, xylyl, tolyl, etc.; aralkyl radicals such as phenylethyl, benzyl, etc.; aliphatic, haloaliphatic and cycloaliphatic radicals such as alkyl, alkenyl, cycloalkyl, haloalkyl including methyl, ethyl, propyl, chlorobutyl, cyclohexyl, etc.; R can be all the same radical or any two or more of the aforementioned radicals, while R is preferably methyl, R' includes all radicals included by R above except hydrogen, where R' can be all the same radical or any two or more of the aforementioned R radicals except hydrogen, and R' is preferably methyl. R' also includes, in addition to all the radicals included by R, except hydrogen, cyanoalkyl radicals such as cyanoethyl, cyanobutyl, etc., radicals. Radicals that are included within the definition of Z of Formula I are hydrogen, methyl, ethyl, propyl, chloro, bromo, iodo, etc. and combinations thereof, and Z is preferably hydrogen.

The hydrolytically stable copolymers of the present invention can be further described as comprising recurring copolymeric units of a polydiorganosiloxane joined by substituted aryloxy-silicon linkages to a polyester of dihydric phenol and a precursor of carbonic acid, where each of said recurring copolymeric units comprises by average weight from about 10 to about 75% of said polydiorganosiloxane, and preferably from about 40 to 70% by weight.

The copolymers of Formula I can be produced by reacting at temperatures in the range of 0° to 100° C., preferably 20° to 50° C., and in the presence of an acid acceptor, a mixture of a halogen chain stopped polydiorganosiloxane having the formula

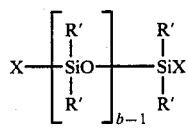

Formula III and a dihydric phenol having the formula

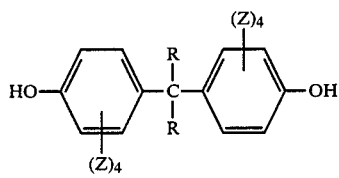

Formula IV and thereafter phosgenating said reaction product until the resulting copolymer achieves a maximum intrinsic viscosity, where R, R', Z and b are as defined above, and X is a halogen radical, preferably chloro.

The halogen chain stopped polydiorganosiloxanes of Formula III can be made by conventional procedures such as by the controlled hydrolysis of a diorganodihalosilane, for example, dimethyldichlorosilane as taught in Patnode U.S. Pat. No. 2,381,366 and Hyde U.S. Pat. Nos. 2,629,726 and 2,902,507.

Another procedure that can be employed involves equilibrating a mixture of a diorganodichlorosilane and a cyclic polydiorganosiloxane in the presence of a metal catalyst such as ferric chloride as shown in Sauer U.S. Pat. No. 2,421,653. Although the various procedures utilized in forming the halogen chain stopped polysiloxane are not critical, generally it has been found desirable to maintain the halogen content of the resulting halogen chain stopped polysiloxane in the range of about 0.4 to about 35% by weight, and preferably from about 1 to about 10% by weight of said halogen chain stopped polysiloxane. The halogen chain stopped polysiloxane is preferably in the form of a chlorinated polydimethylsiloxane.

Dihydric phenols that are included in Formula IV are, for example, 2,2-bis(4-hydroxyphenyl)propane (bisphenol-A); 2,4'-dihydroxydiphenylmethane; bis-(2-hydroxyphenyl)methane; 1,1-bis(4-hydroxyphenyl)ethane; 1,2-bis(4-hydroxyphenyl)ethane; 1,1-bis(4-hydroxy-2-chlorophenyl)ethane; 1,1-bis(2,5-dimethyl-4-hydroxyphenyl)ethane; 1,3-bis(3-methyl-4-hydroxyphenyl)propane; 2,2-bis(3-isopropyl-4-hydroxyphenyl)propane, etc. Mixtures can also be used. Others will occur to those skilled in the art.

The block copolymers of a vinyl aromatic and alkadiene are well known in the art. These polymers are well defined in various U.S. patents including, for example, U.S. Pat. Nos. 4,481,331 and 4,537,930, both patents herein incorporated by reference. Either the aliphatic unsaturated copolymer or the selectively aliphatic hydrogenated polymers can be employed. The latter are preferred. The selectively hydrogenated linear, sequential or radial teleblock copolymer component (b)(i) for use in the present invention may be made by means known in the art and are commercially available. Prior to hydrogenation, the end blocks of these polymers comprise homopolymers or copolymers preferably prepared from alkenyl aromatic hydrocarbons and particularly vinyl aromatic hydrocarbons wherein the aromatic moiety may be either monocyclic or polycyclic. Typical monomers include styrene, alpha methyl styrene, p-methyl styrene, vinyl xylene, ethyl vinyl xylene, vinyl naphthalene, and the like, or mixtures thereof. The end blocks (A) and (A'), may be the same or different. They are preferably selected from styrene, alpha-methyl styrene, vinyl toluene, vinyl xylene, vinyl naphthalene, especially styrene. The center block (B) may be derived from, for example, butadiene, isoprene, 1,3-pentadiene, 2,3-dimethylbutadiene, and the like, and it may have a linear, sequential or teleradial structure.

The selectively hydrogenated linear block copolymers are described by Haefele et al., U.S. Pat. No. 3,333,024, which is incorporated herein by reference.

The ratio of the copolymers and the average molecular weights can vary broadly although the molecular weight of center block should be greater than that of the combined terminal blocks. It is preferred to form terminal blocks A each having a weight average molecular weights of about 2,000 to 60,000 and center block B, e.g., a hydrogenated polybutadiene block with a weight average molecular weight of about 20,000 to 450,000. Still more preferably, the terminal blocks each have a weight average molecular weight of about 7,000 to 35,000 while the hydrogenated polybutadiene polymer blocks have a weight average molecular weight between about 30,000 and 150,000. The terminal blocks will preferably comprise about 20 to 45% by weight, or more preferably about 25 to 40% by weight of the total block polymer. The preferred copolymers will be those having a polybutadiene center block wherein 35 to 55% of the butadiene block segment is the structure resulting from 1,2 addition.

The hydrogenated copolymers will have the average unsaturation reduced to less than 20% of the original value. It is preferred to have the unsaturation of the center block B reduced to 10%, or less, preferably 5% or less of its original value. After hydrogenation, center blocks B derived from isoprene will have the EB (ethylene-butylene structure).

The block copolymers are formed by techniques well known to those skilled in the art. Hydrogenation may be conducted utilizing a variety of hydrogenation catalysts such as nickel on kieselguhr, Raney nickel, copper chromate, molybdenum sulfide and finely divided platinum or other noble metals on a low surface area carrier.

Hydrogenation may be conducted at any desired temperature or pressure from atomspheric to 300 psig, the usual range being between 100 and 1,000 psig at temperatures from 75° F. to 600° F. for times between 0.1 and 24 hours, preferably from 0.2 to 8 hours.

Hydrogenated block copolymers such as Kraton G 1650 and Kraton G-1651 from Shell Chemical Company, Polymers Division, are usable according to the present invention. Also usable are the Solprenes of Phillips.

The radial teleblock copolymers of which the Solprenes are typical examples can be characterized as having at least three polymer branches with each branch of the radial block polymer comprising terminal nonelastomeric segments, e.g. (A) and ($A^1$) as defined hereinabove. The branches of the radial block polymer contain a terminal non-elastomeric segment attached to an elastomeric polymer segment, e.g., (B) as defined above. These are described in Marrs, U.S. Pat. No. 3,753,936 and in Zelinski, U.S. Pat. No. 3,281,383, both of which are incorporated herein by reference, and they are selectively hydrogenated by procedures known per se. In any event, the term, "selective hydrogenation" is used herein to contemplate polymers in which the elastomeric blocks (A) and ($A^1$) have been left unhydrogenated, i.e., aromatic.

The quantity of block copolymer as described above which raises the ⅛ inch Notched Izod to acceptable levels is at least 3 weight percent of the polycarbonate. Preferably, the quantity of polymer is at least 4 weight percent. Higher quantities can be employed; however, quantities beyond 15, preferably 10 weight percent generally do not bring about higher impact resistance and can cause undesirable side effects such as incompatibility as shown by delamination in the molded part and/or poorer flame resistance.

The flame retardant package which achieves a $V_0$ in 93 mils thickness molded parts comprises a flame retardant salt. Such salts are generally inorganic or organic in nature and, when the latter, are preferably the sulfonate salts such as described in U.S. Pat. No. 3,775,367, assigned to Bayer or the aromatic sulfonate salts such as those described in U.S. Pat. Nos. 3,940,366; 3,933,734; 3,948,851; 3,926,908 and 3,909,490, assigned to General Electric Company.

Preferred salts are the perfluoroaliphatic sulfonate salts and the halogenated aromatic sulfonate salts, for example, 2,4,5-trichlorophenylsulfonate sodium salt. Depending upon the type and quantity of the block polymer used to enhance the impact resistance of the composition, various quantities of anti-drip agent should also be employed. Examples of such anti-drip agents include the fluorinated polyethylenes such as polytetrafluoroethylene, preferably in its fibrile form, such as TEFLON ® 30 resin, available from DuPont, and other agents such as bromine attached to an aromatic nucleus, for example, a bisphenol-A polycarbonate having bromine attached to its phenyl rings. Other well known anti-drip agents for polycarbonate can be used alone or in combination with other agents, for example, a siloxane fluid such as DF 1040, an organic siloxane fluid available from General Electric. The presence of these anti-drip agents allow the molded composition to register better than $V_2$ since both $V_0$ and $V_1$, in the Underwriter Laboratory's test system require the absence of non-flaming drips.

Interestingly, the presence of all the above desirable properties in the composition is also accompanied by a further desirable property—the exterior of the molded part has a substantially lower gloss than that of polycarbonate. Generally, the gloss of the injection molded composition part should be less than about 80 as tested by Garnder Glossmeter at 60° gloss, preferably less than about 70 and more preferably less than about 60.

The composition of the invention can be admixed and molded under standard conditions taking into account the substantially lower molecular weight of the polycarbonate. The various components are admixed in the solid state and extruded at a temperature of from about 475° to about 525° F. and molded at a temperature of from about 475° to about 525° F.

Below are examples of the invention and comparative examples showing the results achieved using other potential impact modifiers. The invention examples are intended to illustrate rather than narrow the scope of the invention.

In the examples below, the polycarbonate employed is a bisphenol-A polycarbonate with a number average molecular weight of 8,000 and is referred to in the Table as LEXAN ® resin. The random block polycarbonate polysiloxane employed is bisphenol-A polycarbonate block dimethyl siloxane block with the dimethylsiloxane about 43 weight percent of the molecule. Such resin is available from General Electric Company as Copel 3320 and is referred to in the Table as "LR resin". Kraton G1651 in a selectively hydrogenated block copolymer of polystyrene-polybutadine-polystyrene, available from Shell. The "flame retardant" is sodium 2,3,5-trichlorobenzenesulfonate. The "T B-BPA is 3,5,3', 5'tetrabromobisphenol-A polycarbonate copolymer containing about 26 weight percent bromine. The "drip inhibitor" is a mixture of Teflon 30 available from Dupont, TB-BPA, and bisphenol-A polycarbonate (20, 40, 40 weight percent respectively) and the "PTFE" employed is polytetrafluoroethylene (fibrile or nonfibrile), available from ICI Americas, Inc. by the tradename Whitcon 5. The compositions contained 0.05 phr of tris(2,4-di-t-butylphenyl)phosphite as a heat stabilizer. "UL-94" refers to the Underwriter Laboratory 94 test system for measuring flame retardancy. The "Gloss 60°" is the exterior gloss of a molded part measured by a Gardner Glossmeter at 60° gloss. The superscript in the Notched Izod value refers to the percentage of samples (5) which were ductile at break.

TABLE I

| COMPOSITION | 1 | 2 | 3 | 4 | 5 | 6 | 7 | 8 |
| --- | --- | --- | --- | --- | --- | --- | --- | --- |

TABLE I-continued

| | | | | | | | | |
|---|---|---|---|---|---|---|---|---|
| LEXAN ® Resin | 100 | 100 | 100 | 100 | 100 | 100 | 100 | 100 |
| LR Resin | — | — | 6 | — | 6 | 6 | — | 8 |
| Kraton G 1651 | — | — | — | 6 | — | — | 6 | — |
| Flame Retardant | — | 0.6 | 0.6 | 0.6 | 0.6 | 0.6 | 0.6 | 0.6 |
| TB-BPA | — | 0.6 | 0.6 | 0.6 | 0.6 | 0.6 | 0.6 | 0.6 |
| Drip Inhibitor | — | 0.6 | 0.6 | 0.6 | — | 0.6 | 0.6 | 0.6 |
| PTFE | — | — | — | — | — | 1 | 1 | 1 |
| PROPERTIES | | | | | | | | |
| ⅛" N. Izod (ft. lb/in) | $14.0^{100}$ | $3.4^0$ | $10.3^{100}$ | $11.2^{100}$ | $9.7^{100}$ | $6.0^{60}$ | $6.1^0$ | $7.0^{100}$ |
| UL 94 at 93 mil | — | V0 | V0 | V0 | V2 | V0 | V0 | V0 |
| Gloss 60° | >100 | 89 | 74 | 54 | 79 | 67 | 45 | 64 |

| COMPOSITION | 9 | 10 | 11 | 12 | 13 | 14 | 15 | 16 |
|---|---|---|---|---|---|---|---|---|
| LEXAN ® Resin | 100 | 100 | 100 | 100 | 100 | 100 | 100 | 100 |
| LR Resin | 10 | 10 | 10 | 10 | 10 | — | — | — |
| Kraton G 1651 | — | — | — | — | — | 10 | 10 | 10 |
| Flame Retardant | — | 0.6 | 0.6 | 0.6 | 0.6 | — | 0.6 | 0.6 |
| TB-BPA | — | — | 0.6 | 0.6 | 0.6 | — | 0.6 | 0.6 |
| Drip Inhibitor | — | — | — | 0.6 | 0.6 | — | 0.6 | 0.6 |
| PTFE | — | — | — | — | 1 | — | — | 1 |
| PROPERTIES | | | | | | | | |
| ⅛" N. Izod (ft. lb/in) | $12.4^{100}$ | $11.2^{100}$ | $11.3^{100}$ | $10.5^{100}$ | $9.3^{100}$ | $11.0^{100}$ | $10.2^{100}$ | $8.6^{100}$ |
| UL 94 at 93 mil | V2 | V2 | V2 | V0 | V0 | V2 | B | B |
| Gloss 60° | 89 | 80 | 83 | 72 | 59.8 | 43 | 57 | 52 |

As shown by the data it is only certain combinations of the components which can achieve all of the desired aspects of the invention. It is particularly interesting to note that although each of the (a) components accomplishes the desired goals, they behave in different manners, the presence of more polycarbonate organosiloxane copolymer helping the composition in certain respects and presence of more vinylaromatic alkadiene polymer decreasing the composition flame resistance.

What is claimed is:

1. A composition comprising an aromatic polycarbonate having a number average molecular weight of from about 6,000 to about 10,000 in admixture with
   (a) at least 3 weight percent of a polymer selected from the group consisting of a random block copolymer having polycarbonate block(s) and diorganosiloxane block(s); and a block copolymer of a vinylaromatic and an alkadiene;
   (b) a flame retardant combination comprising a flame retardant salt, said combination in quantities sufficient to achieve V₀ or V₁ in a part 93 mils thick; and
   (c) said composition having an exterior gloss of less than about 80 as measured by a Gardner Glossmeter at 60° gloss.

2. The composition of claim 1 wherein the (a) polymer is a random block having polycarbonate block(s) and diorganosiloxane block(s).

3. The composition of claim 2 wherein the organo groups are methyl.

4. The composition of claim 3 wherein the maximum amount of (a) polymer is about 15 weight percent.

5. The composition of claim 2 wherein the salt is a sulfonate salt.

6. The composition of claim 5 wherein the combination of (c) contains an effective quantity of a drip inhibitor.

7. The composition of claim 6 wherein the drip includes a fluorinated polyolefin.

8. The composition of claim 7 wherein the drip inhibitor further includes a halogenated polymer or compound wherein the halogen is chlorine or bromine.

9. The composition of claim 8 wherein the halogen is bromine.

10. The compostion of claim 9 wherein the fluorinated polyolefin is fibrile or nonfibrile.

11. The composition of claim 1 wherein the (a) polymer is a block copolymer of a vinyl aromatic and an alkadiene.

12. The composition of claim 11 wherein the vinyl aromatic is styrene and the alkadiene is butadiene or isoprene.

13. The composition of claim 12 wherein the polymer is selectively hydrogenated.

14. The composition of claim 13 wherein the selectively hydrogenated aliphatic portion is derived from butadiene.

15. The composition of claim 14 wherein the salt is a sulfonate salt.

16. The composition of claim 15 wherein the combination of (c) contains an effective quantity of a drip inhibitor.

17. The composition of claim 16 wherein the drip inhibitor includes a fluorinated polyolefin.

18. The composition of claim 17 wherein the drip inhibitor further includes a halogenated polymer or compound wherein the halogen is chlorine or bromine.

19. The composition of claim 18 wherein the halogen is bromine.

20. The composition of claim 19 wherein the fluorinated polyolefin is fibrile or nonfibrile.

* * * * *